(12) United States Patent
Ezawa (10) Patent No.: US 10,370,279 B2
(45) Date of Patent: Aug. 6, 2019

(54) METHOD OF CONVEYING PRODUCT, PRODUCT CONVEYANCE APPARATUS, METHOD OF PRODUCING OPTICAL ELEMENT, OPTICAL ELEMENT PRODUCTION APPARATUS, AND NON-TRANSITORY COMPUTER-READABLE MEDIUM

(71) Applicant: CANON KABUSHIKI KAISHA, Tokyo (JP)

(72) Inventor: Mitsuharu Ezawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/050,656

(22) Filed: Jul. 31, 2018

(65) Prior Publication Data
US 2019/0062192 A1     Feb. 28, 2019

(30) Foreign Application Priority Data

Aug. 23, 2017    (JP) ................................ 2017-160600

(51) Int. Cl.
| | | |
|---|---|---|
| *C03B 11/04* | (2006.01) | |
| *C03B 11/08* | (2006.01) | |
| *C03B 11/16* | (2006.01) | |
| *C03B 11/12* | (2006.01) | |
| *B65G 49/06* | (2006.01) | |
| *B65H 5/08* | (2006.01) | |

(52) U.S. Cl.
CPC ............ *C03B 11/16* (2013.01); *B65G 49/064* (2013.01); *B65G 49/067* (2013.01); *B65H 5/08* (2013.01); *C03B 11/04* (2013.01); *C03B 11/08* (2013.01); *C03B 11/122* (2013.01); *C03B 11/125* (2013.01)

(58) Field of Classification Search
CPC .......... C03B 11/04; C03B 11/08; C03B 11/16
See application file for complete search history.

(56) References Cited

U.S. PATENT DOCUMENTS

| | | | | |
|---|---|---|---|---|
| 2004/0186622 | A1* | 9/2004 | Aiuchi .............. | H01L 21/67276 700/241 |
| 2006/0048380 | A1* | 3/2006 | Okuda ................. | H05K 13/083 29/832 |
| 2007/0116550 | A1* | 5/2007 | Nakamura ............ | B62D 5/003 414/797 |

(Continued)

FOREIGN PATENT DOCUMENTS

| | | | | |
|---|---|---|---|---|
| JP | 2001-139334 A | | 5/2001 | |
| JP | 2001139334 A | * | 5/2001 | ........... C03B 11/005 |

*Primary Examiner* — Thomas Randazzo
(74) *Attorney, Agent, or Firm* — Venable LLP (57) ABSTRACT

A product conveyance apparatus includes an actuator, a movement portion, a first position detection portion, a second position detection portion, and a controller. The controller performs a process of causing the actuator not holding a product to move to a predetermined position, detecting the position of the actuator and storing the position as a first position, a process of causing the actuator to move on a basis of a movement instruction value and hold the product, causing the actuator holding the product to move to the predetermined position, detecting the position of the product held by the actuator, and storing the position as a second position, and a process of correcting and updating the movement instruction value on a basis of difference between the first position and the second position.

15 Claims, 6 Drawing Sheets

(56) References Cited

U.S. PATENT DOCUMENTS

2014/0065446 A1\* 3/2014 Isono .................... G11B 5/8404
   428/846.9
2017/0028560 A1\* 2/2017 Senn ..................... G06T 7/0004

\* cited by examiner

METHOD OF CONVEYING PRODUCT, PRODUCT CONVEYANCE APPARATUS, METHOD OF PRODUCING OPTICAL ELEMENT, OPTICAL ELEMENT PRODUCTION APPARATUS, AND NON-TRANSITORY COMPUTER-READABLE MEDIUM

BACKGROUND OF THE INVENTION

Field of the Invention

The present invention relates to a method of holding and conveying a product by an actuator, particularly to position control of the actuator when holding the product. More particularly, the present invention relates to a method of holding and conveying an optical blank for producing an optical element.

Description of the Related Art

Conventionally, a method of conveying an optical blank serving as a material to a heated mold and performing press molding is known as a method of producing a lens.

For example, Japanese Patent Laid-Open No. 2001-139334 discloses a press molding apparatus that holds a glass material and conveying the glass material to a mold by using a hand capable of moving rotationally and vertically. In the apparatus disclosed in Japanese Patent Laid-Open No. 2001-139334, the glass material, that is, an optical blank is held and conveyed by a hand including a vacuum suction mechanism.

It is important to accurately transfer the shape of a shaping surface of the mold to the optical blank in order to increase the shape precision of the lens, and, in order to achieve this, it is required to set the optical blank in the mold with high positional precision. In order to set the optical blank with high positional precision, it is required to hold and convey the optical blank in a correct position and orientation. However, generally, the optical blank has a curved surface shape, and does not have a portion like an abutting surface that serves as a position standard when holding the optical blank.

In the case of holding the optical blank by using a vacuum suction mechanism like the apparatus disclosed in Japanese Patent Laid-Open No. 2001-139334, the precision of alignment between the optical blank and the vacuum suction mechanism is important. However, Japanese Patent Laid-Open No. 2001-139334 does not disclose any specific alignment method.

SUMMARY OF THE INVENTION

According to a first aspect of the present invention, a method of conveying a product by using a robot includes a first position storing step in which a controller causes an actuator not holding a product to move to a predetermined position, detects a position of the actuator by a first position detection portion, and stores the position detected by the first position detection portion as a first position, a holding step in which the controller causes the actuator to move on a basis of a movement instruction value that is stored in advance and hold the product, a second position storing step in which the controller causes the actuator that has held the product in the holding step to move to the predetermined position, detects the position of the product held by the actuator by a second position detection portion, and stores the position detected by the second position detection portion as a second position, and a movement instruction value update step in which the controller corrects and updates the movement instruction value on a basis of difference between the first position and the second position. The robot includes the actuator configured to hold the product, a movement portion configured to move the actuator, the first position detection portion configured to detect a position of the actuator, the second position detection portion configured to detect a position of the product held by the actuator, and the controller configured to control the actuator, the movement portion, the first position detection portion, and the second position detection portion.

According to a second aspect of the present invention, a product conveyance apparatus includes an actuator configured to hold a product, a movement portion configured to move the actuator, a first position detection portion configured to detect a position of the actuator, a second position detection portion configured to detect a position of the product held by the actuator, and a controller configured to control the actuator, the movement portion, the first position detection portion, and the second position detection portion. The controller performs a process of causing the actuator not holding the product to move to a predetermined position, detecting the position of the actuator by the first position detection portion, and storing the position detected by the first position detection portion as a first position, a process of causing the actuator to move on a basis of a movement instruction value that is stored in advance and hold the product, causing the actuator holding the product to move to the predetermined position, detecting the position of the product held by the actuator by the second position detection portion, and storing the position detected by the second position detection portion as a second position, and a process of correcting and updating the movement instruction value on a basis of difference between the first position and the second position.

According to a third aspect of the present invention, an optical element production apparatus includes an actuator configured to hold an optical blank, a movement portion configured to move the actuator, a camera, a shaping portion configured to subject the optical blank to a shaping process, and a controller configured to control the actuator, the movement portion, the camera, and the shaping portion. The controller performs a process of causing the actuator not holding the optical blank to move to a predetermined image capturing position, causing the camera to capture an image of the actuator, and storing a position of the actuator as a first position on a basis of the captured image of the actuator, a process of causing the actuator to move on a basis of a movement instruction value that is stored in advance and hold the optical blank, causing the actuator holding the optical blank to move to the predetermined image capturing position, causing the camera to capture an image of the optical blank held by the actuator, and storing a position of the optical blank as a second position on a basis of the captured image of the optical blank, and a process of correcting and updating the movement instruction value on a basis of difference between the first position and the second position, and causing the actuator to move on a basis of the updated movement instruction value, hold the optical blank, and convey the held optical blank to the shaping portion.

Further features of the present invention will become apparent from the following description of exemplary embodiments with reference to the attached drawings.

DESCRIPTION OF THE EMBODIMENTS

A conveyance method and a conveyance apparatus for a product serving as an exemplary embodiment of the present invention will be described. Specifically, a conveyance method and a conveyance apparatus for an optical blank using a conveyance hand provided in an optical element production apparatus and a production method and a production apparatus for an optical element will be described.

Figure 1:
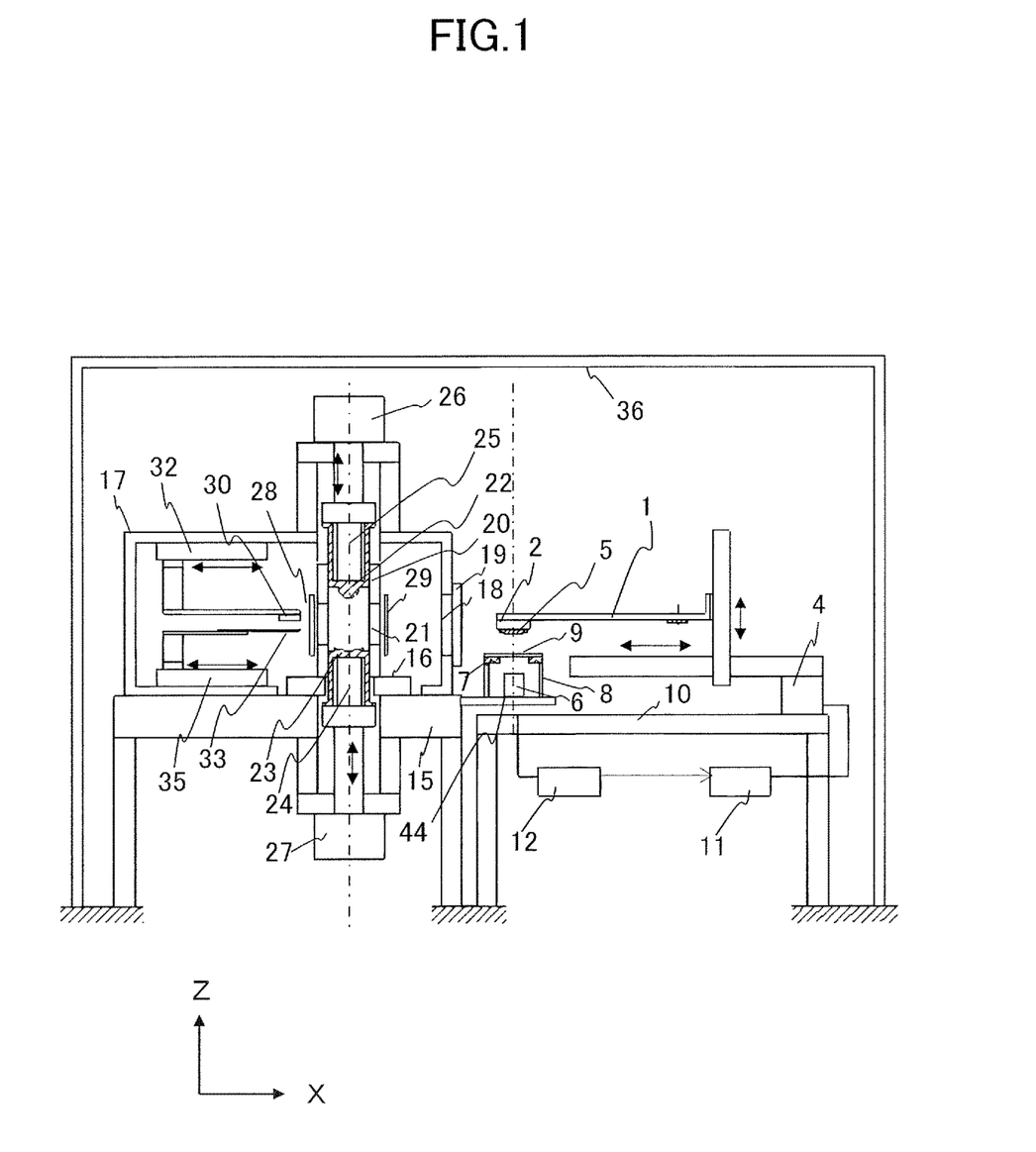
FIG. 1 is a section view of an optical element production apparatus of an exemplary embodiment illustrating a schematic configuration thereof
Figure 2:
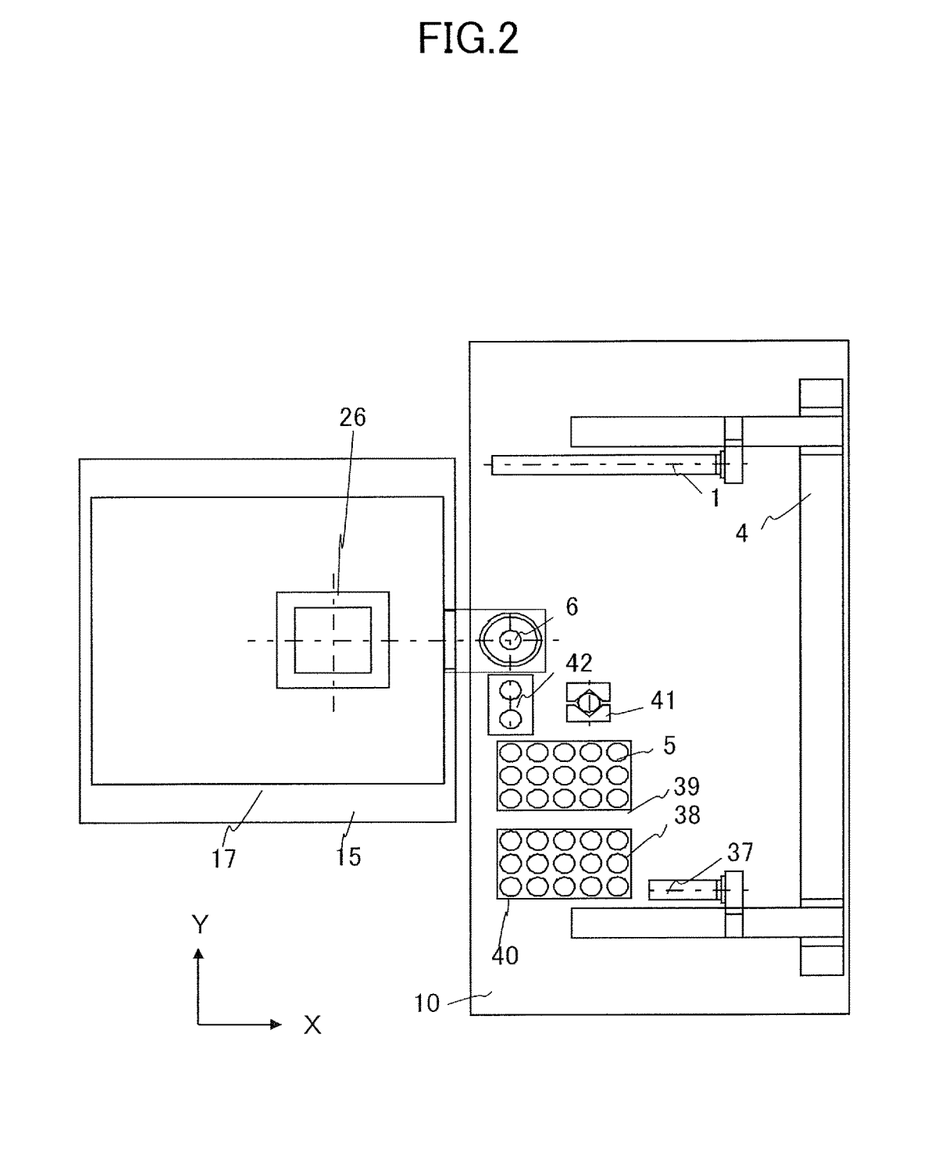
FIG. 2 is a plan view of the optical element production apparatus of the exemplary embodiment illustrating a schematic configuration thereof

FIG. 1 is a section view of an optical element production apparatus of the exemplary embodiment of the present invention illustrating a schematic configuration thereof. In addition, FIG. 2 is a plan view of the same optical element production apparatus illustrating a schematic configuration thereof. In FIGS. 1 and 2, a portion illustrated on the left is a shaping portion that performs press molding using a mold, and a portion illustrated on the right is a conveyance portion provided with an optical blank supply pallet on which an optical blank is placed and a conveyance hand. The optical element production apparatus of the exemplary embodiment will be described with reference to FIGS. 1 and 2.

Conveyance Portion

First, a configuration of the conveyance portion of the optical element production apparatus will be described.

A conveyance robot 4 is disposed on a conveyance portion base plate 10 that is a base plate of the conveyance portion. To be noted, so as to suppress occurrence of thermal or mechanical mutual interference between the conveyance portion and the shaping portion, the conveyance portion base plate 10 and a shaping portion base plate 15 are separated from each other.

The conveyance robot 4 includes a first conveyance hand 1 and a second conveyance hand 37, and each hand is coupled to an orthogonal 3-axis motion mechanism of X, Y, and Z directions and configured to convey an optical blank, a molded product, and the like.

The first conveyance hand 1 and the second conveyance hand 37 are each provided with a suction pad for sucking an optical blank at a distal end thereof. The first conveyance hand 1 and the second conveyance hand 37 can be each called as a movement portion that moves a suction pad provided thereon serving as an actuator. FIG. 1 illustrates a state in which an optical blank 5 is held by a suction pad 2 of the first conveyance hand 1.

To be noted, examples of the actuator configured to hold a product include various actuators other than a suction pad such as hands provided with fingers, and embodiments of the present invention is not limited to a suction pad. The present invention can be widely applied to position control of actuator at the time of picking up, holding, and conveying a product by an actuator.

An optical blank supply pallet 39, a centering unit 41, a slow cooling stage 42, and a molded product accommodating pallet 38 are disposed on the conveyance portion base plate 10.

The optical blank supply pallet 39 is a pallet capable of accommodating a plurality of optical blanks 5.

The centering unit 41 is a device that performs alignment of an optical blank 5, that is, centering of the optical blank 5 having a curved surface shape. The centering is performed by placing the optical blank 5 between two opposing V-shaped blocks provided in the centering unit 41 and clamping the optical blank 5 by moving the blocks in such a direction as to approach each other. Thus, the optical blank 5 is positioned at the center of the centering unit 41. To be noted, as will be described later, the optical blank 5 is taken out from the optical blank supply pallet 39 and conveyed to and placed on the centering unit 41 by the second conveyance hand 37. Then, the optical blank 5 centered by the centering unit 41 is taken out and conveyed to the shaping portion by the first conveyance hand 1.

Since the optical blanks 5 placed on the optical blank supply pallet 39 are not necessarily precisely positioned, the optical blank 5 cannot be always held at the center of the second conveyance hand 37 at the time of taking out the optical blank 5 by the second conveyance hand 37. Therefore, by holding the optical blank 5 by moving the first conveyance hand 1 to the center position of the centering unit 41 after aligning the optical blank 5 with the center position of the centering unit 41 by using the centering unit, the optical blank 5 can be held in the vicinity of the center of the first conveyance hand 1. However, every motion of the centering unit 41 also varies, and therefore the centering position is sometimes gradually displaced in a certain direction as the number of times of the motion increases. Therefore, in the present exemplary embodiment, movement control of the first conveyance hand 1 is corrected as appropriate at the time of moving the first conveyance hand 1 to the position of the centering unit 41 to take out the optical blank 5. Details of this will be described later.

The slow cooling stage 42 is a stage for slowly cooling a product taken out of the shaping portion immediately after press molding. The top surface of the slow cooling stage 42 is provided with a mesh formed from a material such as pure gold having high thermal conductivity and high oxidization resistance such that a hot product does not crack due to heat shock.

The molded product accommodating pallet 38 is a pallet capable of accommodating a plurality of products 40 whose cooling has been completed.

In addition, a camera 6 is disposed to face upward so as to capture an image of a space above the conveyance portion base plate 10. To be noted, in the description below, a range in which an image can be captured by the camera 6 disposed in a fixed manner will be referred to as an image capturing position.

The camera 6 includes an image pickup element such as a charge coupled device: CCD or a complementary metal-oxide-semiconductor: CMOS sensor, is fastened to the shaping portion base plate 15 via a camera mounting plate 44, and therefore is less likely to be affected by vibration and thermal deformation of the conveyance portion base plate 10. In addition, the camera 6 and an image capturing illumination light source 7 are surrounded by the camera mounting plate 44, a light-shielding cover 8, and a heat-resisting transparent glass 9 that are always cooled with water, and is not likely to be affected by the change in the atmospheric temperature in a light-shielding clean booth 36. As described above, the camera 6 is configured such that the image capturing position is not displaced by influence of heat and vibration, and thus the camera 6 is capable of capturing, from below and through the heat-resisting transparent glass thereabove, an image of a conveyance hand and an optical blank that have moved to a certain position in the image capturing range. To be noted, the shaping portion and the conveyance portion are entirely surrounded by the light-shielding clean booth 36, and thus image capturing conditions of the camera 6 are configured so as not to be affected by illumination outside the apparatus or the like.

Figure 3:
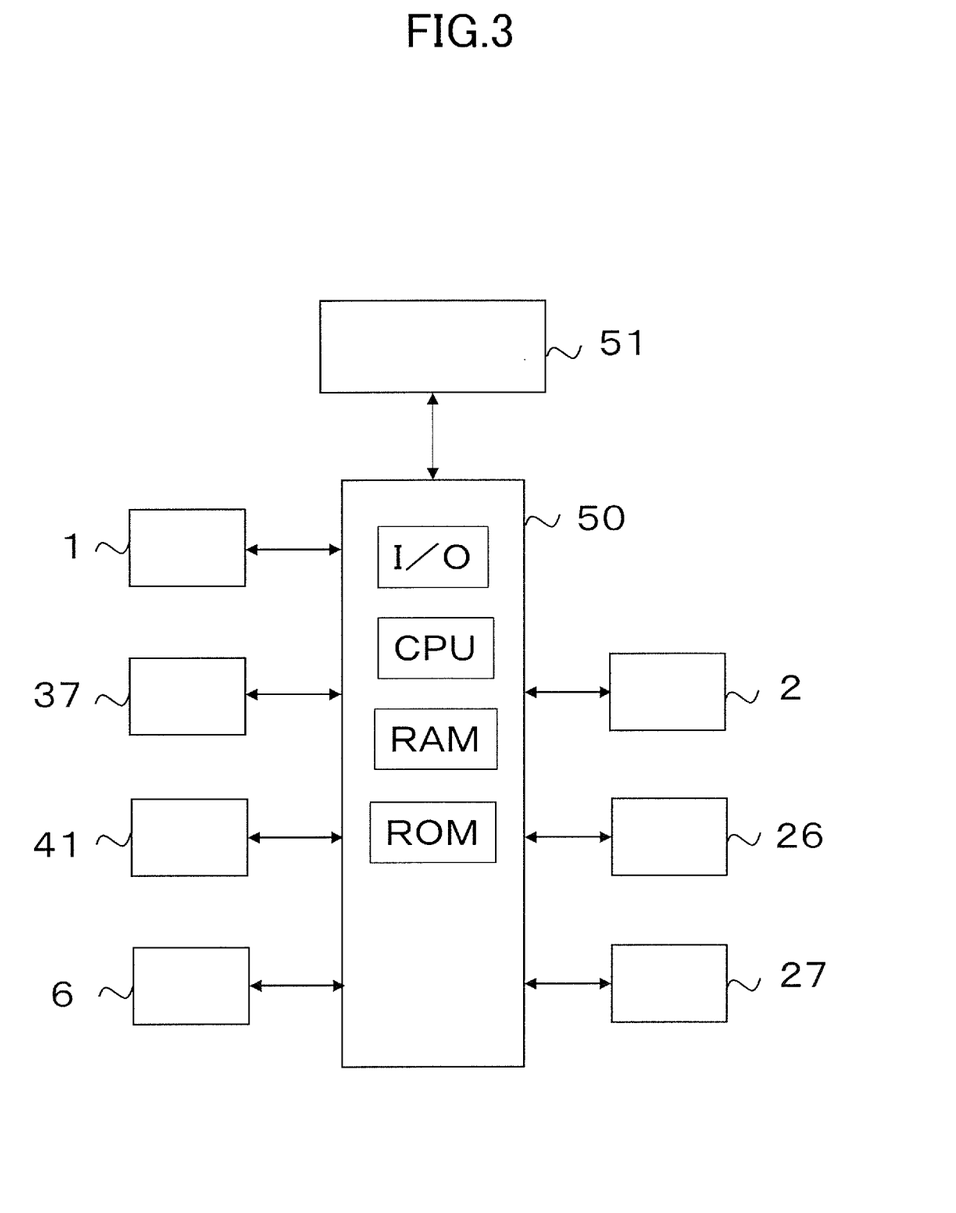
FIG. 3 is a control block diagram of the exemplary embodiment.

Image data of a captured image obtained by the camera 6 is subjected to image processing by a position detection processing portion 12 of a controller 50, thus the position of the optical blank 5 or the suction pad 2 of the first conveyance hand 1 is detected, and a detection result is input in a conveyance robot controller 11. The conveyance robot controller 11 updates, by using the input detection result, a movement instruction value used for moving the first conveyance hand 1 to the position of the centering unit 41 to take out the optical blank 5. Movement control of the first conveyance hand 1 will be described later. To be noted, although functions of the position detection processing portion 12 and the conveyance robot controller 11 included in the controller 50 may be realized by individually provided electrical circuits, the functions may be realized by one computer by using software. In this case, the controller 50 may be constituted by a computer.

Shaping Portion

Next, the configuration of the shaping portion of the optical element production apparatus will be described. The shaping portion performs a shaping process to process the conveyed optical blank into an optical element.

A nitrogen-purged chamber 17 is disposed on the shaping portion base plate 15 that is a base plate of the shaping portion, and a shaping chamber including a body mold 20, an upper press mold 22, a lower press mold 23, a scraper 33, an optical blank heater 30, body mold side opening shutters 28 and 29 is disposed in the nitrogen-purged chamber 17.

The amounts of supply and exhaustion of nitrogen of the nitrogen-purged chamber 17 are respectively controlled by a nitrogen supply system and a nitrogen exhaustion system that are not illustrated, and thus the inner pressure thereof is appropriately controlled. A body mold base plate 16 is disposed on the shaping portion base plate 15, and the body mold 20 is fixed to the body mold base plate 16. The body mold base plate 16 is always cooled with water so as to prevent heat discharged at the time of press molding from being transmitted to the shaping portion base plate 15. The upper press mold 22 and the lower press mold 23 are inserted in the body mold, and the body mold 20, the upper press mold 22, and the lower press mold 23 are configured to be coaxial.

To be noted, body mold side opening portions 21 are provided in side surfaces of the body mold 20. The body mold side opening shutters 28 and 29 are respectively disposed in front of the body mold side opening portions 21 at appropriate distances therefrom, and can be individually opened and closed by an unillustrated driving portion.

An upper mold heater 25 and a lower mold heater 24 are respectively embedded in the upper press mold 22 and the lower press mold 23. The upper press mold 22 and the lower press mold 23 are configured to be heated by these heaters. The upper press mold 22 and the lower press mold 23 are respectively connected to an upper press mold driving unit 26 and a lower press mold driving unit 27, and a pressing load can be applied by individually ascending and descending the upper press mold 22 and the lower press mold 23. That is, the optical blank 5 can be subjected to press molding by the upper press mold 22 and the lower press mold 23. The nitrogen-purged chamber 17 is provided with a chamber side opening portion 18 and is sealed with a chamber side opening shutter 19, and thus the oxygen concentration in the nitrogen-purged chamber 17 can be kept at a predetermined value or lower. In addition, the chamber side opening shutter 19 can be opened and closed by an unillustrated driving portion, and the first conveyance hand 1 can get into the nitrogen-purged chamber 17 through the chamber side opening portion 18.

Further, by opening the body mold side opening shutter 29, the first conveyance hand 1 can get into the body mold 20. By opening the body mold side opening shutter 28, the optical blank heater 30 and a scraper 33 can be caused to individually get into and out of the body mold 20 respectively by driving units 32 and 35. The optical blank heater 30 is capable of getting into the body mold 20 and contactlessly heating the optical blank 5 placed on the lower press mold 23, and thus heating the optical blank 5 before press molding to the softening point.

The scraper 33 can separate a product 40 in vacuum contact with the upper press mold 22 from the upper press mold 22 by bringing a distal end portion thereof into contact with the product 40 after the press molding and moving up the upper press mold 22 by the upper press mold driving unit 26. Since the scraper 33 comes into contact with the product 40 at a high temperature after completion of the press molding, an unillustrated heater is embedded therein and the distal end portion of the scraper 33 is configured to be kept at a high temperature.

To be noted, when performing press working on an optical blank serving as a workpiece, first, a first conveyance hand holds the optical blank outside a nitrogen-purged chamber, and the optical blank is moved to a mold by moving the first conveyance hand into the nitrogen-purged chamber. Then, after placing the optical blank at a center portion of a forming surface of the mold serving as an operation position by controlling the position of the first conveyance hand, the first conveyance hand is moved out of the chamber, and press working is performed. To take out the workpiece subjected to press working, the first conveyance hand is moved into the chamber again, and is moved out of the nitrogen-purged chamber while holding the processed workpiece by controlling the position of the conveyance hand.

This production process of the optical element is performed under the control of the controller 50 included in the optical element production apparatus, and a control program for each component of the apparatus including the hand is created and stored in the controller 50 in advance.

Control Block

Next, control blocks of the optical element production apparatus of the exemplary embodiment will be described.

FIG. 3 is a control block diagram of the optical element production apparatus. The controller 50 is a computer for controlling the operation of the optical element production apparatus, and includes a central processing unit: CPU, a read-only memory: ROM, a random access memory: RAM, an input/output port: I/O port, and so forth. The ROM stores an operation program of the optical element production apparatus.

Although a program for performing various processing related to the conveyance method of the present exemplary embodiment may be stored in the ROM similarly to the other operation program, the program may be loaded into the RAM from the outside via a network. Alternatively, the program may be loaded into the RAM from a computer-readable recording medium storing the program.

The I/O port is connected to an external device and a network, and data necessary for production of a lens can be input from and output to an external computer 51 via the I/O port.

The controller 50 is connected to the suction pad 2, the first conveyance hand 1, the second conveyance hand 37, the centering unit 41, and the camera 6 and controls these. Further, the controller 50 is connected to the upper press mold driving unit 26, the lower press mold driving unit 27, the body mold side opening shutters 28 and 29, the optical blank heater 30, and the scraper 33 and controls these. The controller 50 controls operation of these components, and thus performs processing related to overall process of producing a lens including conveyance of an optical blank. To be noted, for the sake of convenience of illustration, FIG. 3 illustrates only part of elements controlled by the controller 50.

Control Flow

Next, a procedure of a conveyance method according to the exemplary embodiment will be described.

Figure 4:
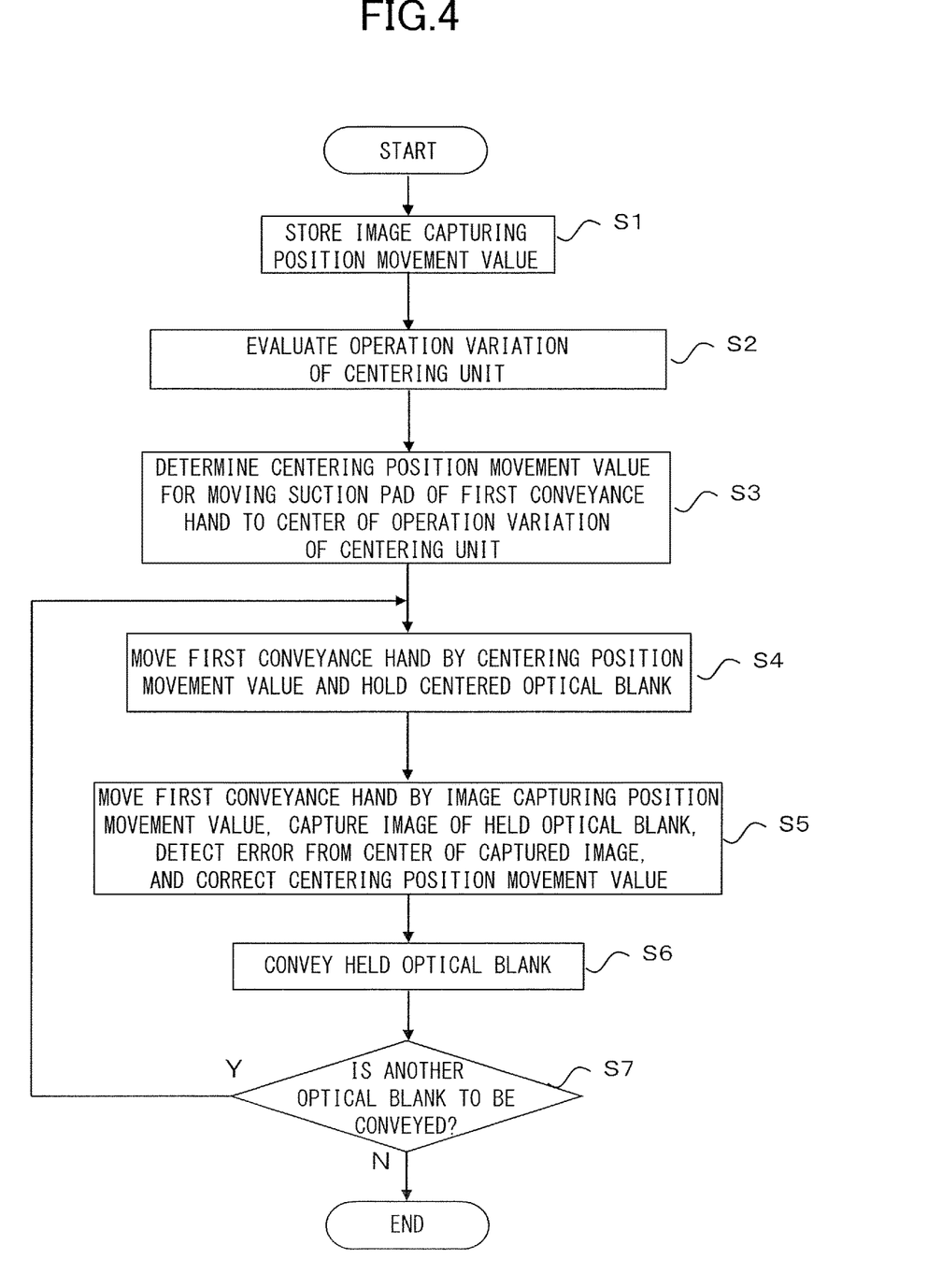
FIG. 4 is a flowchart illustrating a conveyance procedure of the exemplary embodiment.

FIG. 4 is a flowchart illustrating a procedure of conveying the optical blank in the optical element production apparatus. That is, FIG. 4 illustrates a procedure in which the optical blank 5 centered by the centering unit 41 is taken out, held, and conveyed to the shaping portion by the first conveyance hand 1 with high positional precision.

First, step S1 of determining an image capturing position movement value is performed. The image capturing position movement value is a driving condition for moving the first conveyance hand 1 such that the suction pad 2 provided on the first conveyance hand 1 is positioned at the center of an image captured by the camera 6 fixed to the shaping portion base plate 15.

Figure 5:
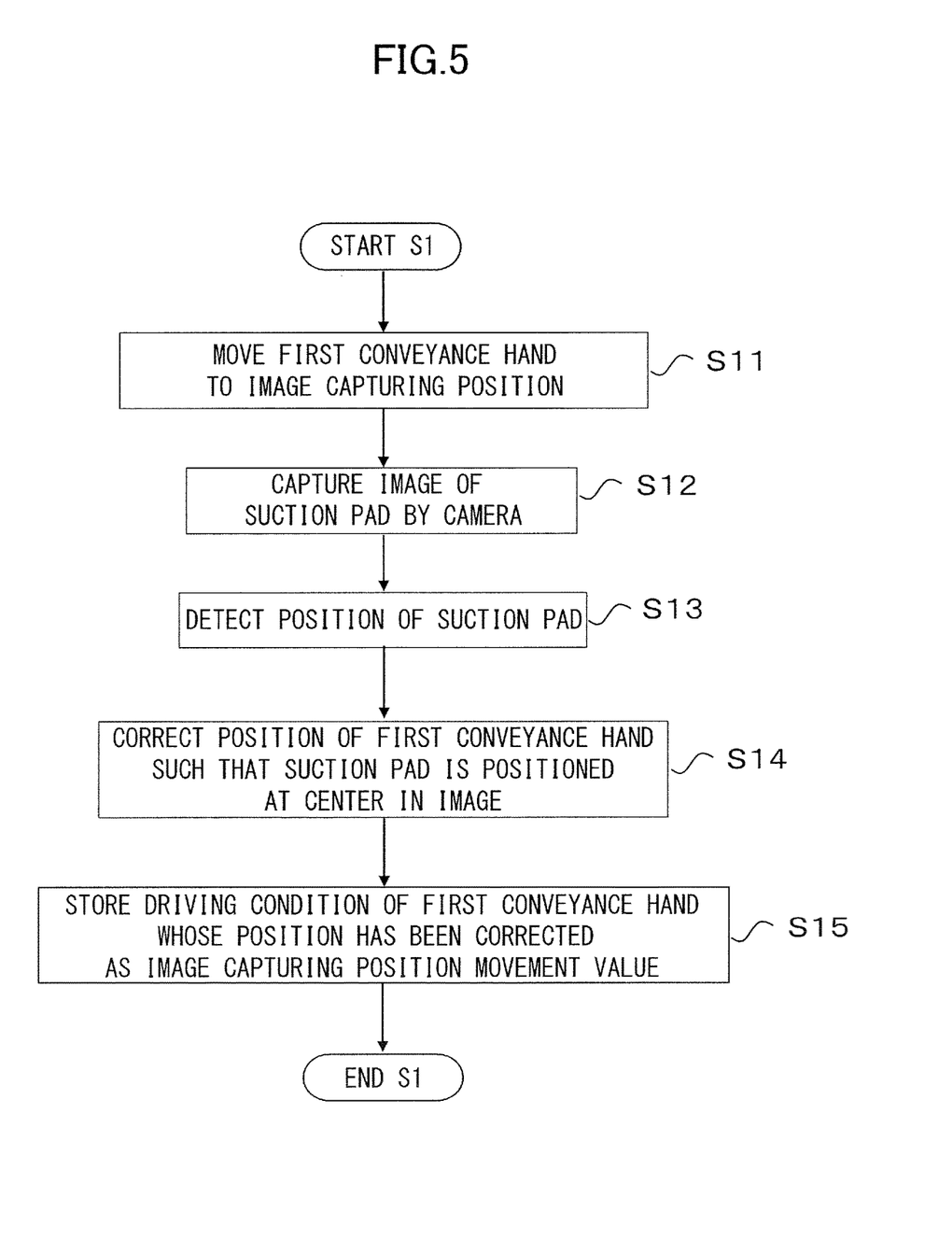
FIG. 5 is a flowchart illustrating details of a step 51.

Details of step S1 are shown in a flowchart of FIG. 5.

The controller 50 transmits an instruction to a driving mechanism of the first conveyance hand 1 to move the first conveyance hand 1 to the image capturing position in step S11 by using a program prepared in advance, and causes the camera 6 to capture an image in step S12.

In step S13, the controller 50 detects the position of the suction pad 2 of the first conveyance hand 1 on the basis of the captured image.

In step S14, the controller 50 obtains deviation of the suction pad 2 from the center position of the image on the basis of the detection result and corrects the instruction transmitted to the driving mechanism of the first conveyance hand 1 on the basis of the deviation such that the suction pad 2 is positioned at the center of the image.

In step S15, the controller 50 stores, as the image capturing position movement value, the driving condition for instructing the driving mechanism of the first conveyance hand 1 to position the suction pad 2 at the center of the image of the camera 6, that is, the condition obtained in step S14.

By performing step S1 described above, the controller 50 stores the image capturing position movement value for driving the first conveyance hand 1 such that the suction pad 2 of the first conveyance hand 1 is positioned at the center of the image of the camera 6. To be noted, assuming that the center of the field of view of the camera 6 as a first position, step Si can be also referred to as a first position storing step in which the fact that the position of the suction pad 2 when the first conveyance hand 1 is moved on the basis of the image capturing position movement value is the first position is stored by the controller 50.

Referring back to FIG. 4, in step S2, operation variation of the centering unit 41 is evaluated.

First, the controller 50 causes the second conveyance hand 37 to hold and convey an optical blank placed on the optical blank supply pallet 39 to set the optical blank in the centering unit 41. Next, the controller 50 drives the centering unit 41 to center the optical blank. Then, the controller 50 drives the first conveyance hand 1 to hold the centered optical blank. When holding the optical blank, the suction pad 2 of the first conveyance hand 1 is moved to a holding operation position, that is, the center position of the centering unit 41. Conditions are determined in advance and a movement instruction value is stored such that this movement is performed with high positional precision. Then, the controller 50 drives the first conveyance hand 1 on the basis of the image capturing position movement value to move the suction pad 2 holding the optical blank to the image capturing position of the camera 6. The controller 50 causes the camera 6 to capture an image of the optical blank.

If there is no error in the centering operation of the optical blank by the centering unit 41, the optical blank should be positioned at the center of the captured image. However, each operation of the centering unit 41 can include error in reality.

In the case where the position of the optical blank in the captured image is a second position, in the present exemplary embodiment, the controller 50 is capable of detecting the error in the operation of the centering unit 41 by measuring displacement of the second position from the center of the captured image. Therefore, the controller 50 measures and stores second positions of a number sufficient to statistically analyze the error of operation of the centering unit 41. That is, in step S2, the controller 50 performs a second position storing step of measuring the second position a plurality of times and storing data of the plurality of measurements, in order to grasp the variation and distribution of the error.

The controller 50 is capable of obtaining the center position of variation of errors by, for example, obtaining a simple average of errors. After this, the displacement at the time of sucking and holding the optical blank can be reduced on average by moving the suction pad 2 of the first conveyance hand 1 to the center of the variation of errors instead of the center position of the centering unit 41. Therefore, in step S3, the controller 50 obtains the center position of variation of errors on the basis of the difference between the second positions and the first position that are stored, and determines the center position as a centering position movement value.

After this, in step S4, the controller 50 drives the first conveyance hand 1 on the basis of the centering position movement value when the optical element production apparatus picks up the optical blank from the centering unit 41 by using the first conveyance hand 1.

If the operation of the centering unit 41 does not show temporal change, the centering position movement value obtained in step S3 can be continuously used. However, in reality, it is often the case that the center position of the operation variation of the centering unit 41 moves as the time elapses.

Therefore, in the present exemplary embodiment, when the centered optical blank is picked up from the centering unit 41 in step S4, the optical blank is moved to the image capturing position of the camera 6 and an image thereof is captured to obtain the second position, and the displacement of the optical blank from the center position of the captured image is measured. Then, the centering position movement value to be used when picking up the optical blank next time is corrected by using the obtained displacement. That is, in step S5, a movement instruction value update step of updating the movement instruction value on the basis of the difference between the first position and the second position is performed.

Although the correction may be performed by calculating a simple average of all difference data obtained in step S2 and difference data obtained in step S5, it is preferable to use a moving average for correction to sensitively reflect the recent tendency of the temporal change. That is, an average value of pieces of difference data obtained in measurements of a predetermined number of times including this time may be calculated and used as a new centering position movement value for the update.

After the centering position movement value is corrected, in step S6, the controller 50 drives the first conveyance hand 1 to convey the optical blank that the first conveyance hand 1 holds.

When the first conveyance hand 1 conveys the optical blank to the shaping portion and sets the optical blank in the mold, the deviation obtained in step S5 can be used as a correction value for position control.

Further, in the case of taking out another optical blank from the centering unit 41 to convey the other optical blank, the process goes back to step S4 and the conveyance operation is continued. However, in the case of finishing the conveyance of optical blank, the conveyance operation is finished in step S7.

According to the exemplary embodiment of the present invention, when holding the optical blank by using an actuator, the optical blank is held such that the center of the actuator matches the center position of the positional variation, or distribution, of the optical blank, and thus the error of the position and orientation in which the optical blank is held can be reduced greatly. Therefore, the positional precision at the time of conveying and setting the optical blank to the mold can be increased, and the shape precision of the molded optical element can be increased.

Modifications

Embodiments of the present invention is not limited the example described above. For example, the first conveyance hand and the second conveyance hand do not have to be used, and one hand or three or more hands may be provided. The product serving as a target of conveyance is not limited to an optical blank, and the conveyance operation is not limited to the operation of conveying the optical blank from a centering unit to a mold. In addition, the actuator that holds the product is not limited to a suction pad, and may be, for example, a robot hand provided with a finger. The image processing for determining the image capturing position movement value and the centering position movement value can be appropriately changed in accordance with the product and the actuator. In addition, although the image capturing position movement value is determined by performing adjustment such that the actuator is positioned at the center in the captured image in the exemplary embodiment described above, the configuration is not limited to this. For example, the position of the actuator is not limited to the center of the captured image, and in the case where the position of the actuator in the captured image obtained when the actuator is driven under a certain driving condition is stored, the displacement of holding position between the actuator and the product can be detected when the product is held and an image thereof is captured under the certain driving condition.

In addition, the detection of the position of the actuator and the detection of the position of the product held by the actuator do not have to be performed by the same camera.

In the case where the position of the actuator is detected by a first position detection portion and the position of the product held by the actuator is detected by a second detection portion, the first position detection portion and the second position detection portion may be constituted by the same apparatus or different apparatuses.

In addition, the apparatus of the first position detection portion and the second position detection portion is not limited to a camera, and, for example, an infrared radiation sensor or a magnetic sensor may be used.

For example, the position of the actuator may be detected by a position detection mechanism such as an infrared radiation sensor or a magnetic sensor by providing a marker at a position where the center of the held workpiece should be positioned in a holding mechanism or a suction mechanism.

In addition, the center position of the workpiece held by the holding mechanism may be performed by a position detection mechanism such as an infrared radiation sensor or a magnetic sensor by providing a marker at a position where the center of the held workpiece should be positioned.

That is, as long as the position of the actuator and the position of the workpiece can be appropriately detected in accordance with the material or type of the workpiece and characteristics of the operation procedure, the first position detection portion and the second position detection portion may be the same apparatus or different apparatuses of different kinds.

Example

A specific example of the exemplary embodiment described above will be described.

First, step S2 of the flowchart of FIG. 4 was performed by using the optical element production apparatus described in the exemplary embodiment, and the operation variation of the centering unit 41 was evaluated. That is, the error of operation of the centering unit 41 was measured a number of times sufficient to statistically analyze the error to measure the variation, or distribution, of errors. Specifically, the error was measured 50 times.

Figure 6:
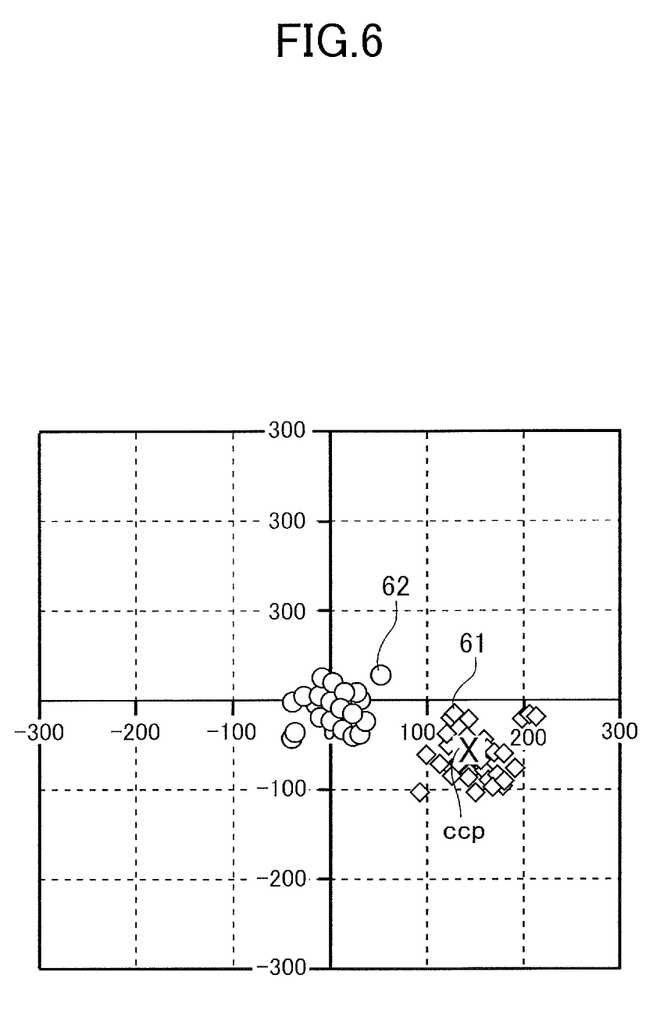
FIG. 6 is a graph illustrating a conveyance state of an example.

FIG. 6 shows results of the measurement. FIG. 6 is a graph in which measured positions of the optical blank are pointed on a coordinate system in which the center of the image captured by the camera 6 is the origin. In FIG. 6, the positions of the optical blank measured in step S2 are shown as points 61 by using blank square marks. In the present example, as illustrated in FIG. 6, the points 61 are spread with a ccp (150, −60) indicated by X mark as a center of distribution.

Therefore, in step S3, a position displaced from the position stored as the center of the centering unit by an amount by which the ccp (150, −60), which is the center of distribution of the variation, is displaced from the origin of the coordinate system was determined as the centering position movement value. Then, after this, steps S3 to S7 were repetitively performed. In FIG. 6, positions of the optical blank measured in step S5 are shown as points 62 by using blank circle marks.

In the present example, as illustrated in FIG. 6, the points 62 are distributed with the origin of the coordinate system, which is the center position of the captured image, as the center. If the present invention had not been implemented, at least variation as large as the points 61 measured before would have occurred. It can be seen that the center of the suction pad holds the center position of the optical blank with high positional precision as a result of implementing the present invention.

In the present example, the centering position movement value was corrected and updated by using a moving average of 50 results in step S5. As a result of this, even in the case where temporal change occurred in the operation characteristic of the centering unit and the ccp that was the center of distribution of the variation was displaced, the position of the suction pad 2 was corrected in accordance with the change.

According to the present example, when holding the optical blank by using the actuator, the optical blank was held such that the center of the actuator matched the center position of the positional variation, or distribution, of the optical blank, and thus the error of the holding position and orientation was successfully reduced greatly. Therefore, the positional precision at the time of conveying and setting the optical blank to the mold was improved, and the shape precision of the molded optical element was improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-160600, filed Aug. 23, 2017, which is hereby incorporated by reference herein in its entirety.

What is claimed is:

1. A method of conveying a product by using a robot comprising an actuator configured to hold the product, a movement portion configured to move the actuator, a first position detection portion configured to detect a position of the actuator, a second position detection portion configured to detect a position of the product held by the actuator, and a controller configured to control the actuator, the movement portion, the first position detection portion, and the second position detection portion, the method comprising:
a first position storing step in which the controller causes the actuator not holding the product to move to a predetermined position, detects the position of the actuator by the first position detection portion, and stores the position detected by the first position detection portion as a first position;
a holding step in which the controller causes the actuator to move on a basis of a movement instruction value that is stored in advance and hold the product;
a second position storing step in which the controller causes the actuator that has held the product in the holding step to move to the predetermined position, detects the position of the product held by the actuator by the second position detection portion, and stores the position detected by the second position detection portion as a second position; and
a movement instruction value update step in which the controller corrects and updates the movement instruction value on a basis of difference between the first position and the second position.

2. The method according to claim 1,
wherein the movement instruction value update step is executed after the holding step and the second position storing step are performed a plurality of times, and
wherein the controller configured to update, in the movement instruction value update step, the movement instruction value on a basis of difference between the first position and an average of a plurality of second positions that are stored.

3. The method according to claim 1,
wherein the movement instruction value update step is executed after the holding step and the second position storing step are performed a plurality of times, and
wherein the controller configured to update, in the movement instruction value update step, the movement instruction value on a basis of difference between the first position and a moving average of a plurality of second positions that are stored.

4. The method according to claim 1,
wherein the first position detection portion and the second position detection portion are configured by a same camera, and
wherein the predetermined position is in an image capturing range of the camera.

5. A non-transitory computer-readable medium which stores a program causing the controller to execute the method according to claim 1.

6. A method of producing an optical element in which the actuator holds and conveys an optical blank as the product to a shaping portion of the optical element by the method according to claim 1.

7. A product conveyance apparatus comprising:
an actuator configured to hold a product;
a movement portion configured to move the actuator;
a first position detection portion configured to detect a position of the actuator;
a second position detection portion configured to detect a position of the product held by the actuator; and
a controller configured to control the actuator, the movement portion, the first position detection portion, and the second position detection portion,
wherein the controller is configured to perform a process of causing the actuator not holding the product to move to a predetermined position, detecting the position of the actuator by the first position detection portion, and storing the position detected by the first position detection portion as a first position, a process of causing the actuator to move on a basis of a movement instruction value that is stored in advance and hold the product, causing the actuator holding the product to move to the predetermined position, detecting the position of the product held by the actuator by the second position detection portion, and storing the position detected by the second position detection portion as a second position, and a process of correcting and updating the movement instruction value on a basis of difference between the first position and the second position.

8. The product conveyance apparatus according to claim 7, wherein the controller is configured to perform a process of performing the process of causing the actuator to move to the predetermined position, detecting the position of the product held by the actuator by the second position detection portion, and storing the position detected by the second position detection portion as the second position a plurality of times, and updating the movement instruction value on a basis of difference between the first position and an average of a plurality of second positions that are stored.

9. The product conveyance apparatus according to claim 7, wherein the controller is configured to perform a process of performing the process of causing the actuator to move to the predetermined position, detecting the position of the product held by the actuator by the second position detection portion, and storing the position detected by the second position detection portion as the second position a plurality of times, and updating the movement instruction value on a basis of difference between the first position and a moving average of a plurality of second positions that are stored.

10. The product conveyance apparatus according to claim 7, wherein the first position detection portion and the second position detection portion are configured by a same camera, and wherein the predetermined position is in an image capturing range of the camera.

11. An optical element production apparatus comprising:
an actuator configured to hold an optical blank;
a movement portion configured to move the actuator;
a camera;
a shaping portion configured to subject the optical blank to a shaping process; and
a controller configured to control the actuator, the movement portion, the camera, and the shaping portion,
wherein the controller performs
a process of causing the actuator not holding the optical blank to move to a predetermined image capturing position, causing the camera to capture an image of the actuator, and storing a position of the actuator as a first position on a basis of the captured image of the actuator, a process of causing the actuator to move on a basis of a movement instruction value that is stored in advance and hold the optical blank, causing the actuator holding the optical blank to move to the predetermined image capturing position, causing the camera to capture an image of the optical blank held by the actuator, and storing a position of the optical blank as a second position on a basis of the captured image of the optical blank, and a process of correcting and updating the movement instruction value on a basis of difference between the first position and the second position, and causing the actuator to move on a basis of the updated movement instruction value, hold the optical blank, and convey the held optical blank to the shaping portion.

12. The optical element production apparatus according to claim 11, further comprising a centering unit configured to center a position of the optical blank, wherein the movement instruction value that is stored in advance is an instruction value for moving the actuator to a position of the centering unit.

13. The optical element production apparatus according to claim 11, wherein the controller performs a plurality of times the process of causing the actuator to move on the basis of the movement instruction value that is stored in advance and hold the optical blank, causing the actuator holding the optical blank to move to the predetermined image capturing portion, causing the camera to capture an image of the optical blank held by the actuator, and storing the position of the optical blank as the second position on the basis of the captured image of the optical blank, and wherein the controller performs a process of updating the movement instruction value on a basis of difference between the first position and an average of a plurality of second positions.

14. The optical element production apparatus according to claim 11, wherein the controller performs a plurality of times the process of causing the actuator to move on the basis of the movement instruction value that is stored in advance and hold the optical blank, causing the actuator holding the optical blank to move to the predetermined image capturing portion, causing the camera to capture an image of the optical blank held by the actuator, and storing the position of the optical blank as the second position on the basis of the captured image of the optical blank, and wherein the controller performs a process of updating the movement instruction value on a basis of difference between the first position and a moving average of a plurality of second positions.

15. The optical element production apparatus according to claim 11, wherein the predetermined image capturing position is such a position that the actuator is at a center of the image captured by the camera.

* * * * *